(12) United States Patent
Mitsui

(10) Patent No.: US 9,696,755 B2
(45) Date of Patent: Jul. 4, 2017

(54) OPENING AND CLOSING DEVICE, AND ELECTRONIC DEVICE

(71) Applicant: MITSUBISHI STEEL MFG. CO., LTD., Tokyo (JP)

(72) Inventor: Yasuhiro Mitsui, Chiba (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 0 days.

(21) Appl. No.: 14/847,094

(22) Filed: Sep. 8, 2015

(65) Prior Publication Data

US 2016/0066451 A1    Mar. 3, 2016

Related U.S. Application Data

(63) Continuation of application No. PCT/JP2014/072417, filed on Aug. 27, 2014.

(51) Int. Cl.
*G06F 1/16* (2006.01)
*H04N 5/225* (2006.01)
*G03B 17/04* (2006.01)

(52) U.S. Cl.
CPC .......... *G06F 1/1624* (2013.01); *G03B 17/04* (2013.01); *G06F 1/16* (2013.01); *G06F 1/1616* (2013.01); *G06F 1/1679* (2013.01); *G06F 1/1681* (2013.01); *H04N 5/2251* (2013.01)

(58) Field of Classification Search
CPC .......... H04N 5/2251; H05K 5/02; H05K 5/03; H05K 5/0217; H05K 5/0221; H05K 5/0226; H05K 5/0239; H05K 5/2251; G06F 1/1616; G06F 1/1618; G06F 1/162; G06F 1/1624; G06F 1/1675; G06F 1/1679

USPC ........ 348/333.01, 333.06, 333.07, 373, 375, 348/376
See application file for complete search history.

(56) References Cited

U.S. PATENT DOCUMENTS 6,138,826 A * 10/2000 Kanamori .............. A45C 11/38
206/316.2
8,248,772 B2 * 8/2012 Dai ........................ G06F 1/162
361/679.02

(Continued)

FOREIGN PATENT DOCUMENTS

JP    H08-098065    4/1996
JP    H08-098068    4/1996

(Continued)

OTHER PUBLICATIONS

International Search Report mailed on Oct. 21, 2014.
Extended European Search Report for 14885066.2 mailed on Mar. 31, 2017.

*Primary Examiner* — Lin Ye
*Assistant Examiner* — Chriss Yoder, III
(74) *Attorney, Agent, or Firm* — IPUSA, PLLC

(57) ABSTRACT

There is provided an opening and closing device including a base; a movable member that is moved between a retracted position and a forward position by making linear movement and rotational movement with respect to the base; and a locking system for locking the movable member at the retracted position, wherein locking of the movable member by the locking system is released by rotationally moving the movable member, and thereby the linear movement of the movable member is allowed.

7 Claims, 11 Drawing Sheets

(56) References Cited

U.S. PATENT DOCUMENTS

| | | | |
|---|---|---|---|
| 8,284,554 B2* | 10/2012 | Stone | G06F 1/1618 345/168 |
| 8,532,723 B2* | 9/2013 | Ahn | G06F 1/1616 455/566 |
| 9,444,980 B2* | 9/2016 | Ujiie | G03B 17/04 |
| 2003/0103324 A1* | 6/2003 | Gallivan | G06F 1/1616 361/679.27 |
| 2011/0141679 A1 | 6/2011 | Dai et al. | |
| 2011/0287819 A1* | 11/2011 | Lee | H04M 1/0237 455/575.4 |

FOREIGN PATENT DOCUMENTS

| | | |
|---|---|---|
| JP | H11-068343 | 3/1999 |
| JP | 2001-186382 | 7/2001 |
| JP | 2004-094066 | 3/2004 |
| JP | 2006-138959 | 6/2006 |
| JP | 2009-151957 | 7/2009 |
| JP | 2013-242386 | 12/2013 |

* cited by examiner

OPENING AND CLOSING DEVICE, AND ELECTRONIC DEVICE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2014/072417 filed on Aug. 27, 2014 and designating the U.S, the entire contents of which are hereby incorporated by reference.

BACKGROUND OF THE INVENTION

1. Field of the Invention

The present invention relates to an opening and closing device, and an electronic device.

2. Description of the Related Art

Digital cameras, camcorders and mobile phones are known in the art as electronic devices that are configured such that a liquid crystal display or the like is embedded into a device main body to confirm captured images. Further, an electronic device is provided that is configured such that an opening and closing device for opening and closing a display unit is provided in a device main body, and the display unit can be opened and closed with respect to the device main body, so that a liquid crystal display can be viewed from various angles.

Recently, taking a self portrait photograph by using an electronic device (so called "selfie"), such as a digital camera, is becoming popular. In such a case, in a state in which the display unit is accommodated in the rear surface of the device main body, a photographer who is located in front of the device main body may not view the liquid crystal display.

For this reason, an opening and closing device and an electronic device are provided that are configured such that, even if a photographer is located in front of the device main body, the display unit can be moved to a position at which the liquid crystal display can be viewed (Patent Document 1).

Patent Document 1: Japanese Unexamined Patent Publication No. 2006-138959

The display unit that includes the liquid crystal display has, however, a relatively large thickness. Thus, with a configuration in which the display unit is pivoted around a rotational shaft with respect to the device main body, a corner portion of the display unit that is disposed at aside that is closer to the rotational shaft and a corner portion of the device main body that is disposed at a side that is closer to the rotational shaft come into contact with each other with the rotation.

One of illustrative objects of an embodiment of the present invention is to provide an opening and closing device and an electronic device that can be downsized and with which operability can be enhanced.

SUMMARY OF THE INVENTION

According to an aspect of the present invention, there are provided a base; a movable member that is moved between a retracted position and a forward position by making linear movement and rotational movement with respect to the base; and a locking system for locking the movable member at the retracted position, wherein locking of the movable member by the locking system is released by rotationally moving the movable member, and thereby the linear movement of the movable member is allowed.

According to the aspect of the present invention, downsizing and enhancement of the operability can be achieved.

DESCRIPTION OF THE PREFERRED EMBODIMENTS

Figure 1:
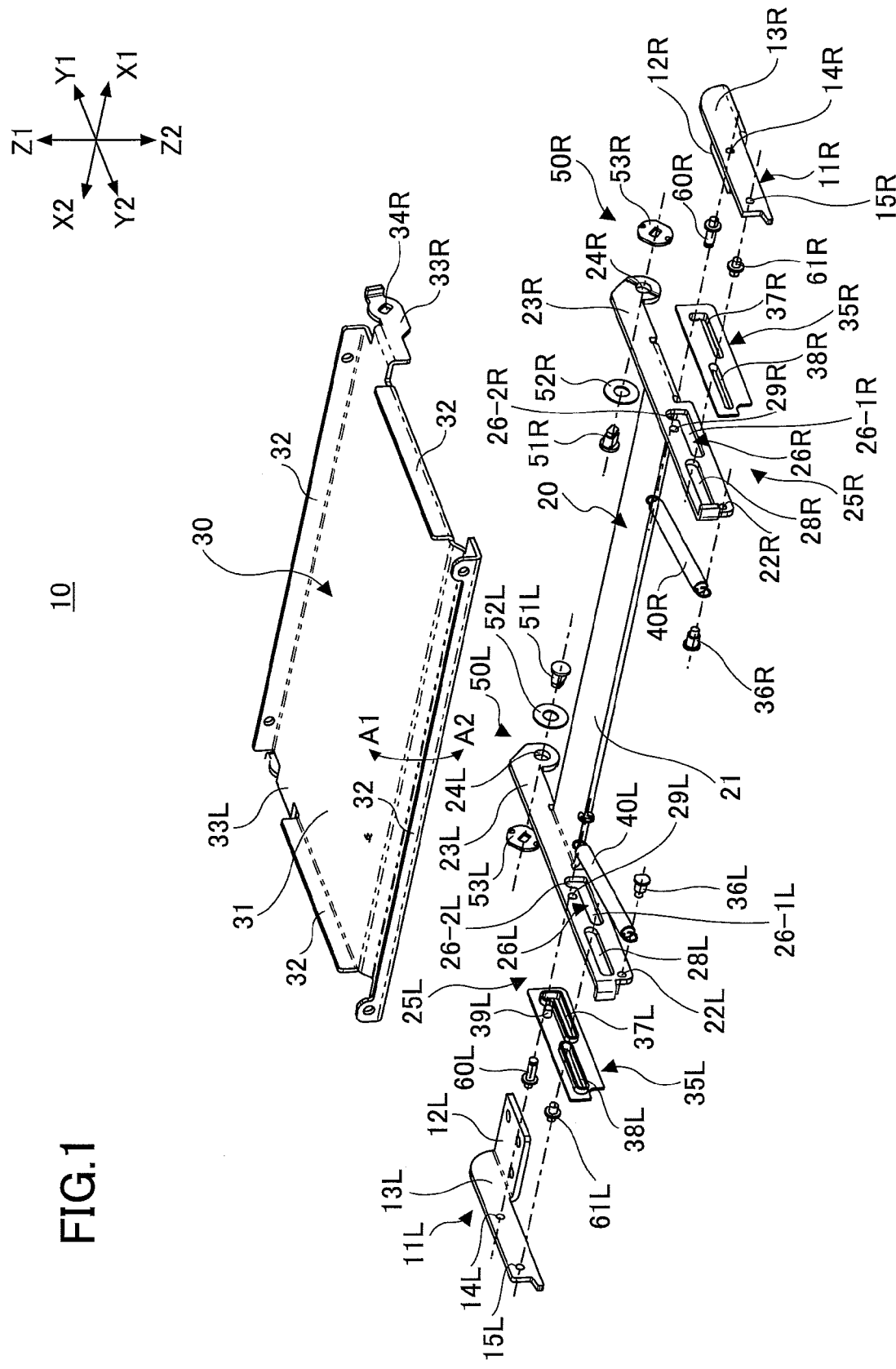
FIG. 1 is an exploded perspective view of an opening and closing device according to an embodiment of the present invention.

Next, a non-limiting exemplary embodiment of the present invention is explained by referring to the accompanying drawings.

Note that, in all the accompanying drawings, the same or corresponding reference numerals are attached to the same or corresponding members or components, and thereby duplicate explanations are omitted. Further, the drawings are not intended to show relative ratios between members or components, except as indicated otherwise. Accordingly, specific dimensions can be determined by a person ordinarily skilled in the art in light of the following non-limiting embodiment.

Further, the embodiment explained below is an example, and does not limit the invention. All the features that are described in the embodiment and their combinations may not be essential to the present invention.

Figure 2A:
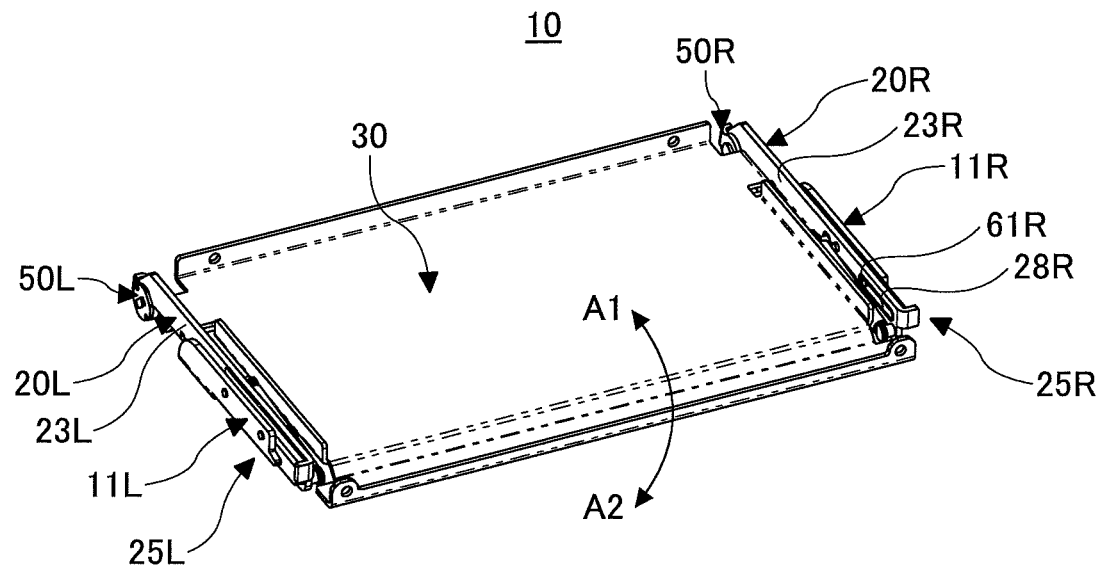
FIG. 2A is a perspective view of the opening and closing device according to the embodiment of the present invention that is in a closed state.
Figure 2B:
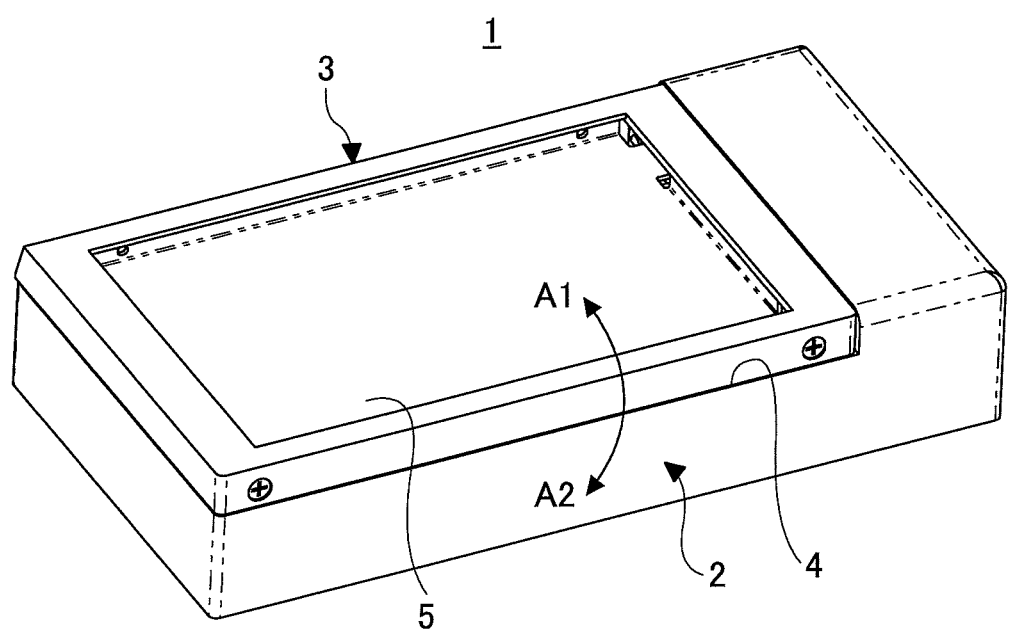
FIG. 2B is a perspective view of an electronic device according to the embodiment of the present invention that is in a closed state.
Figure 3A:
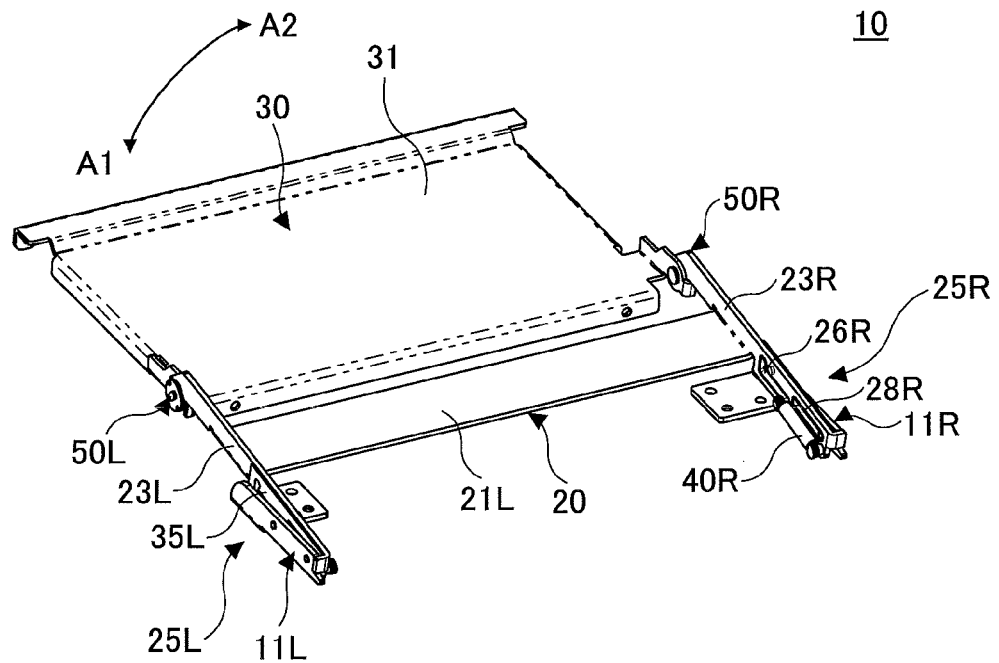
FIG. 3A is a perspective view of the opening and closing device according to the embodiment of the present invention that is in an opened state.
Figure 3B:
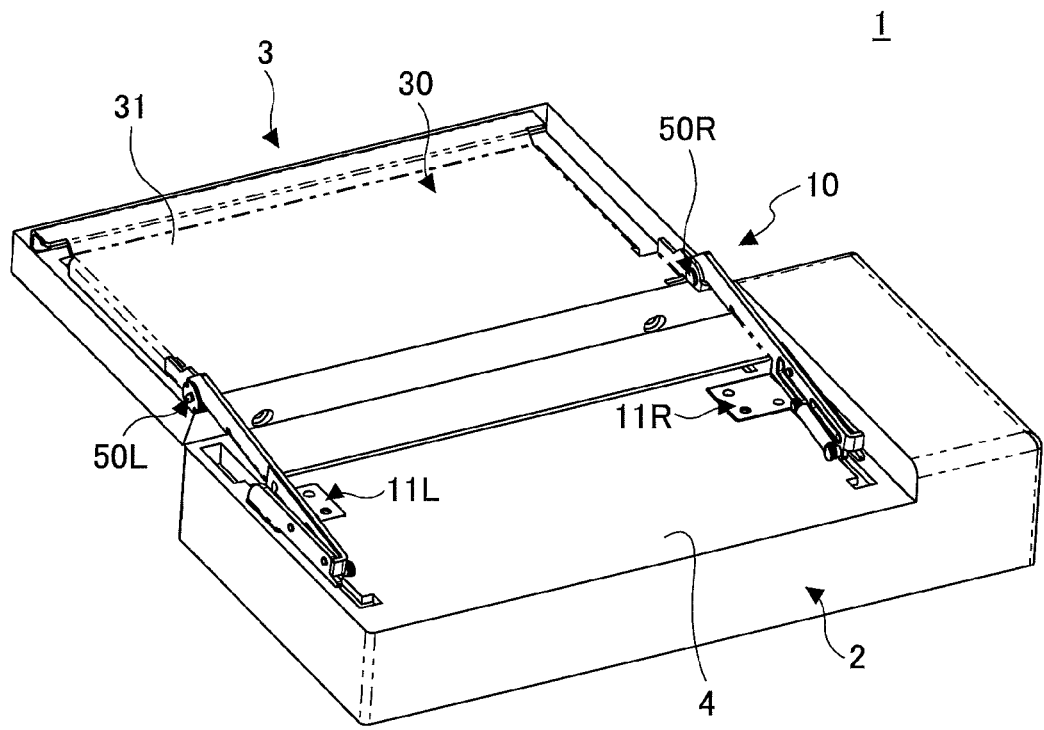
FIG. 3B is a perspective view of the electronic device according to the embodiment of the present invention that is in an opened state.

FIGS. 1 to 3 are diagrams illustrating an opening and closing device 10 according to the embodiment and an electronic device 1 that uses the opening and closing device 10. FIG. 1 is an exploded perspective view of the opening and closing device 10. FIG. 2A is a perspective view showing the opening and closing device 10 in a closed state, and FIG. 2B is a perspective view of the electronic device 1 that is provided with the opening and closing device 10 in the closed state. Further, FIG. 3A is a perspective view showing the opening and closing device 10 in an opened state, and FIG. 3B is a perspective view showing the electronic device 1 in the opened state. Note that definitions of the opened state and the closed state are described below.

The opening and closing device 10 according to the embodiment is provided in the electronic device 1, such as shown in FIGS. 2B and 3B, and the opening and closing device 10 is for moving a display unit 3, so that the display unit 3 can be opened and closed with respect to a device main body 2.

Note that, in the embodiment, a digital camera is exemplified and explained as the electronic device 1. However, application of the present invention is not limited to the digital camera, and the present invention can be broadly applied to various types of electronic devices, such as a camcorder, a cellular phone, and so forth.

First, the electronic device 1 is explained.

The electronic device 1 may include, for example, the device main body 2; the display unit 3; and the opening and closing device 10 that is for opening and closing the display unit 3 with respect to the device main body 2.

A display unit accommodating portion 4 is provided at a rear surface side of the device main body 2. As shown in FIG. 2B, in the closed state, the display unit 3 can be accommodated in the display unit accommodating portion 4.

Further, an image capturing lens (not shown) for taking a photograph is provided at a front surface side of the device main body 2. Additionally, inside the device main body 2, various types of electronic components are disposed that are for executing an image capturing process.

A display device, such as a liquid crystal display 5, is integrally embedded in the display unit 3. An image that is captured by the image capturing lens can be displayed on the liquid crystal display 5 that is provided in the display unit 3. Thus, a photographer can confirm, by the liquid crystal display 5, a screen that is to be captured.

During taking of a general photograph, the display unit 3 is accommodated in the display unit accommodating portion 4 of the device main body 2, as shown in FIG. 2B. Note that, in the following explanation, a state of the electronic device 1 and a state of the opening and closing device 10 in which the display unit 3 is accommodated in the display unit accommodating unit 4 are referred to as closed states.

Recently, taking a self portrait photograph by an electronic device (so called "selfie"), is becoming popular, and the electronic device 1 has a configuration corresponding to this. Specifically, the display unit 3 is configured such that it can be rotated with respect to the device main body 2 in the directions that are indicated by arrows A1 and A2 in FIG. 2B by the opening and closing device 10.

Figure 4A:
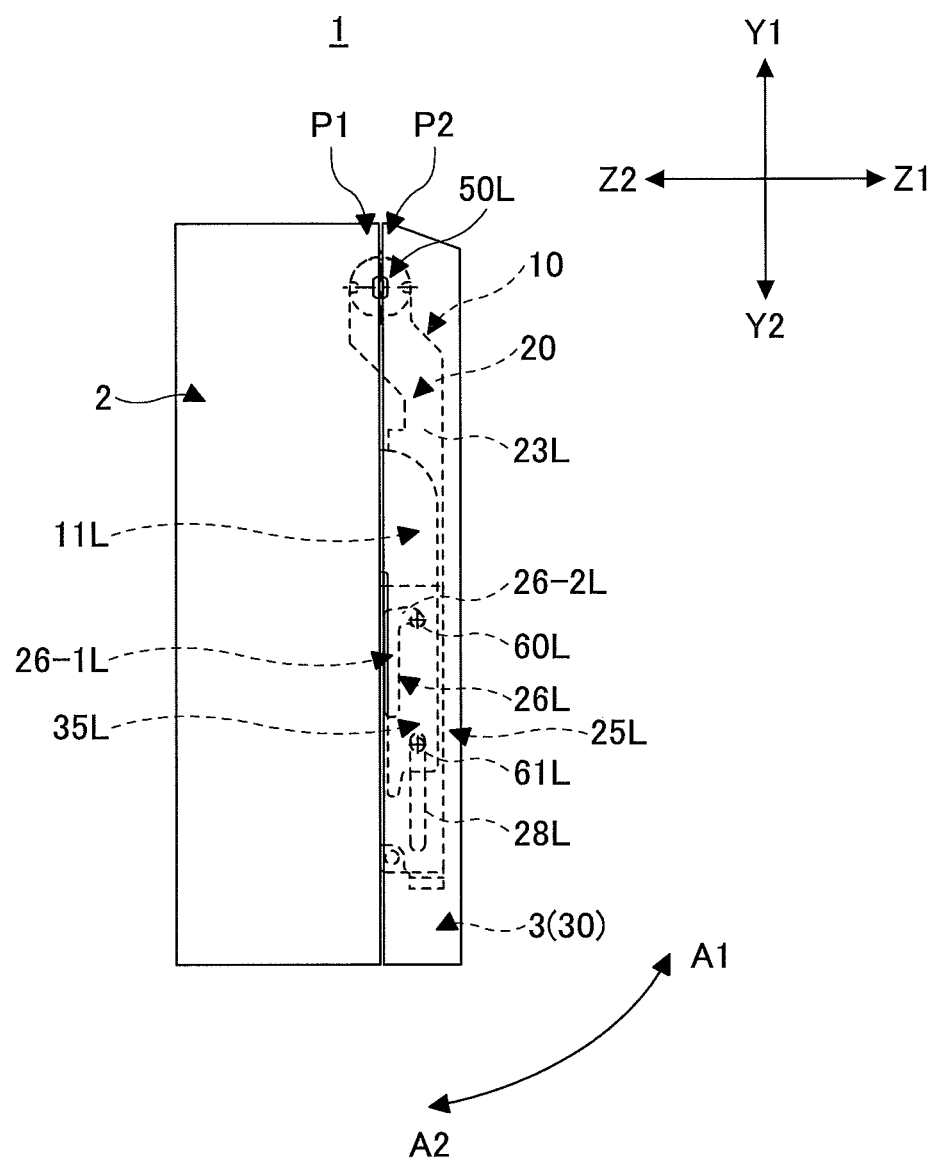
FIG. 4A is a side view (version 1) illustrating operations of the opening and closing device and the electronic device according to the embodiment of the present invention.
Figure 4B:
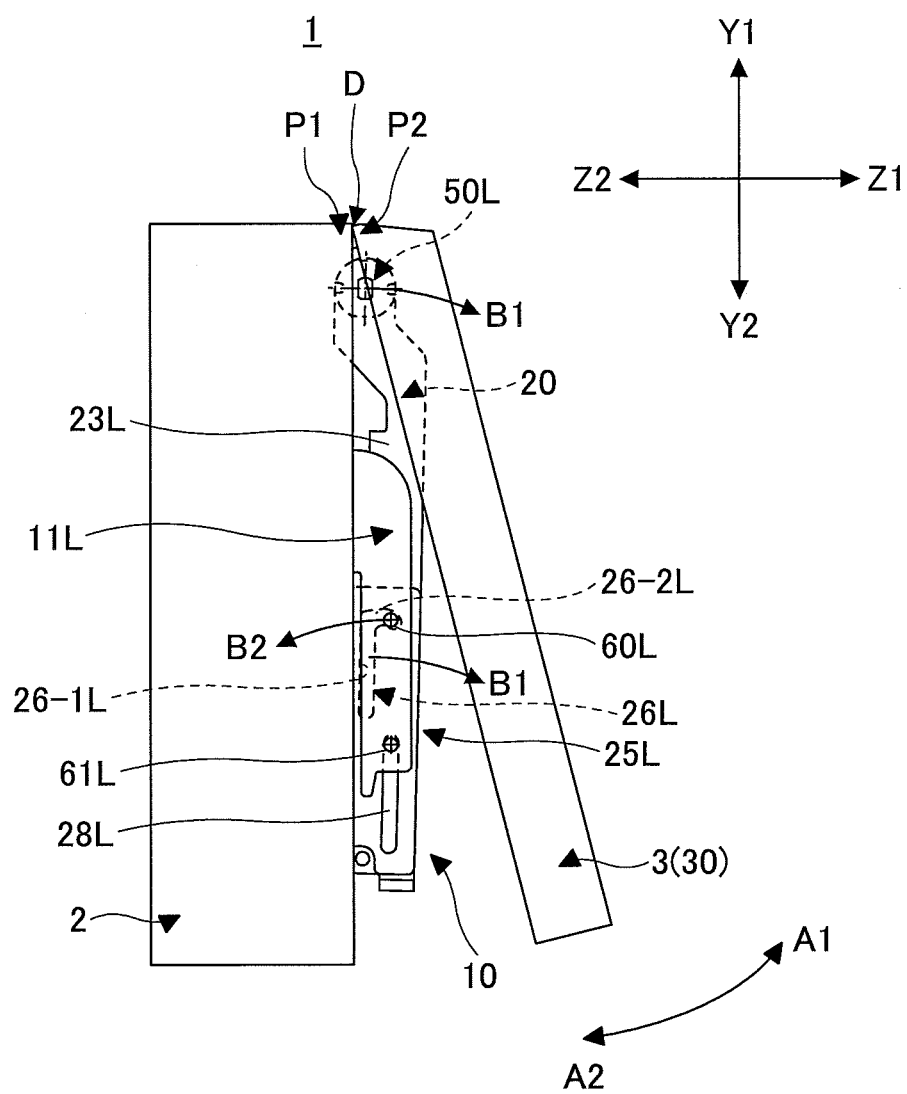
FIG. 4B is a side view (version 2) illustrating the operations of the opening and closing device and the electronic device according to the embodiment of the present invention.
Figure 4C:
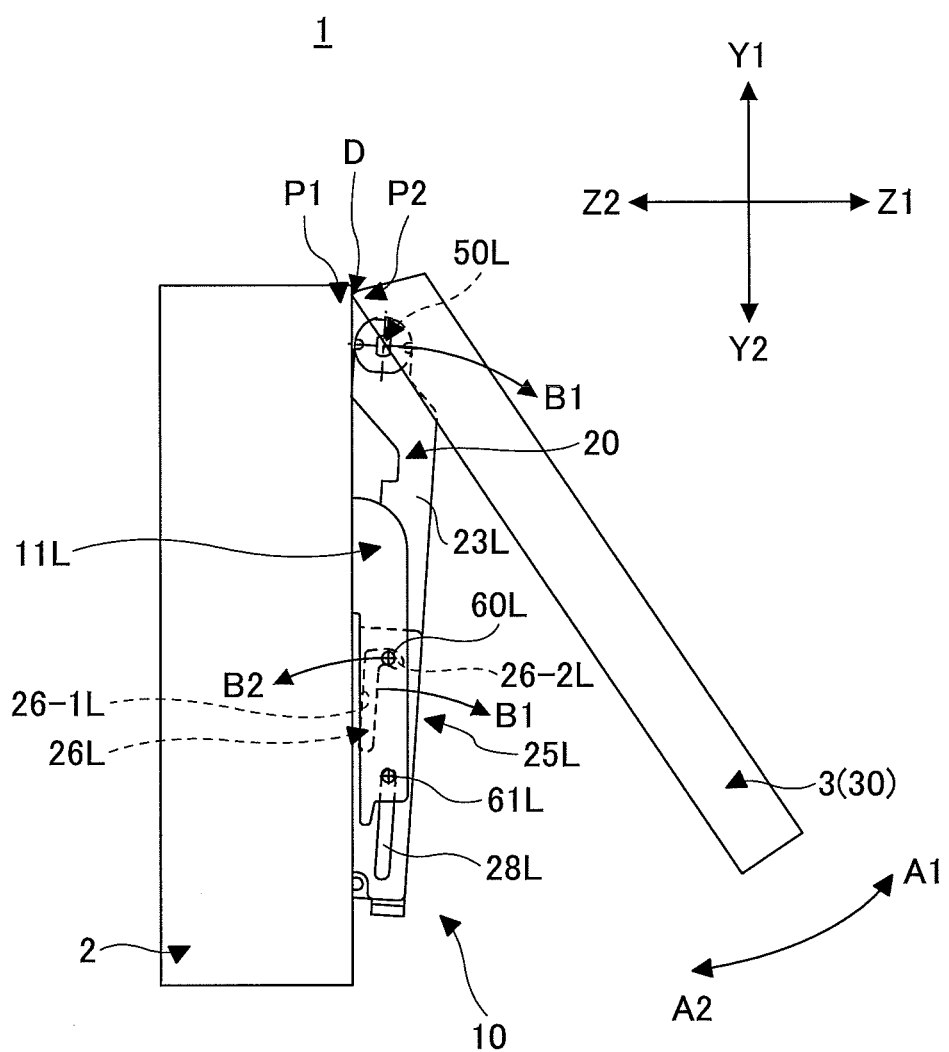
FIG. 4C is a side view (version 3) illustrating the operations of the opening and closing device and the electronic device according to the embodiment of the present invention.
Figure 4D:
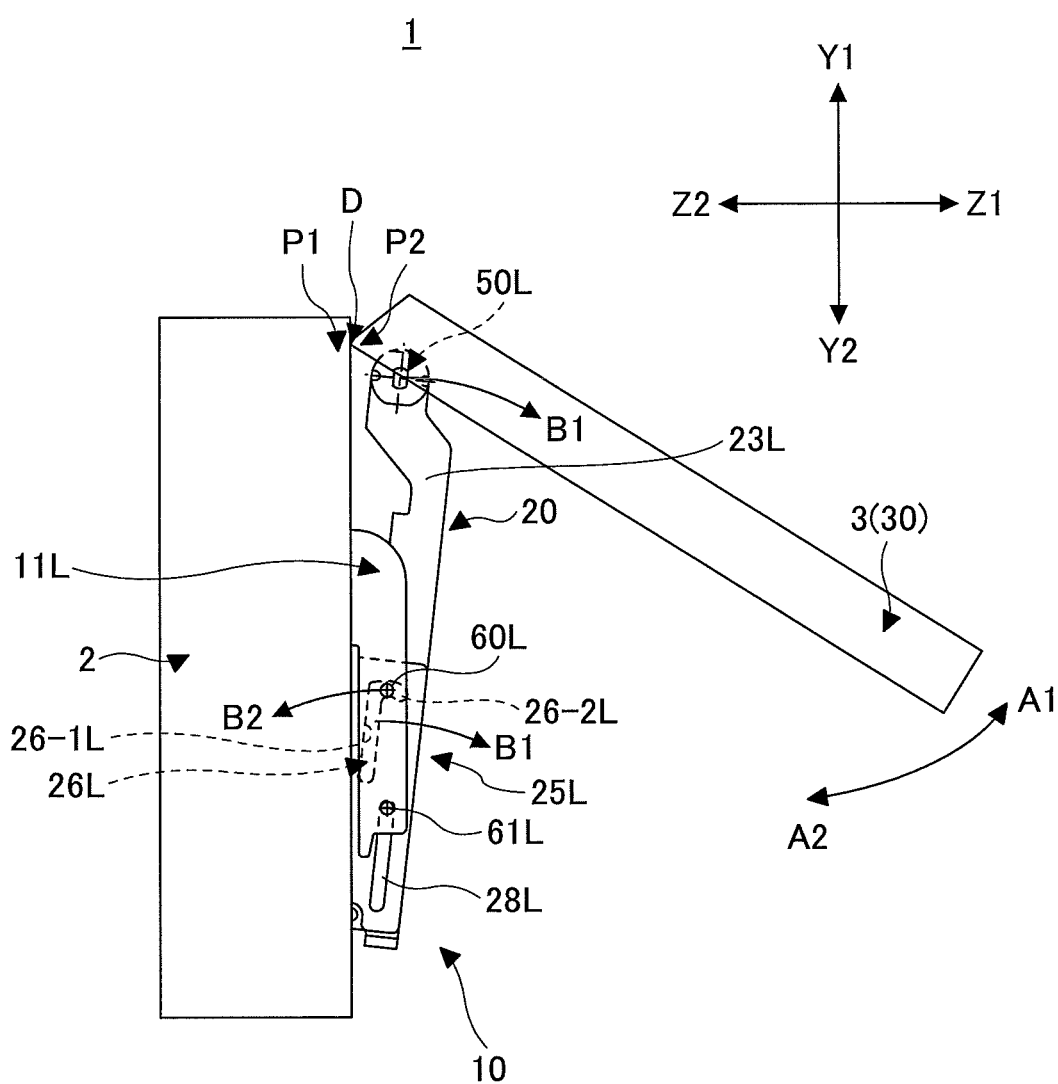
FIG. 4D is a side view (version 4) illustrating the operations of the opening and closing device and the electronic device according to the embodiment of the present invention.
Figure 4E:
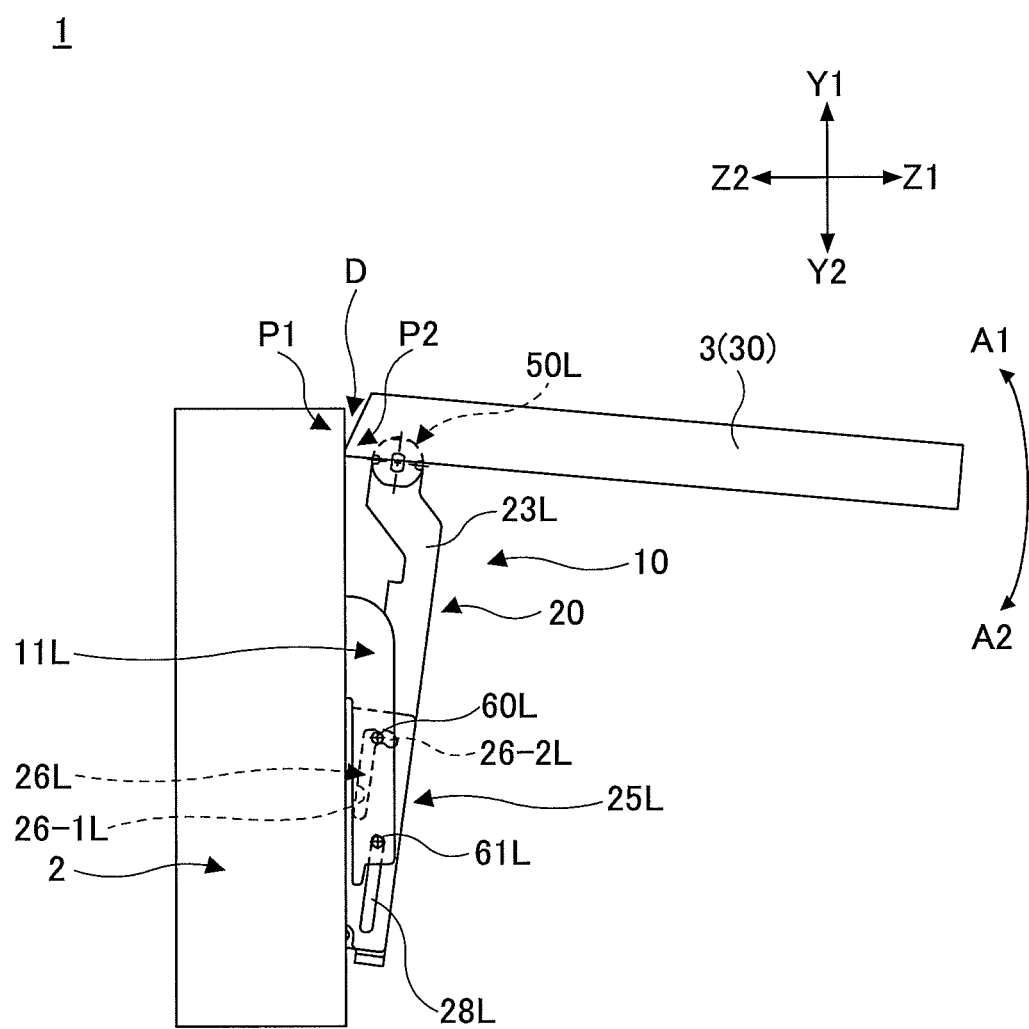
FIG. 4E is a side view (version 5) illustrating the operations of the opening and closing device and the electronic device according to the embodiment of the present invention.
Figure 4F:
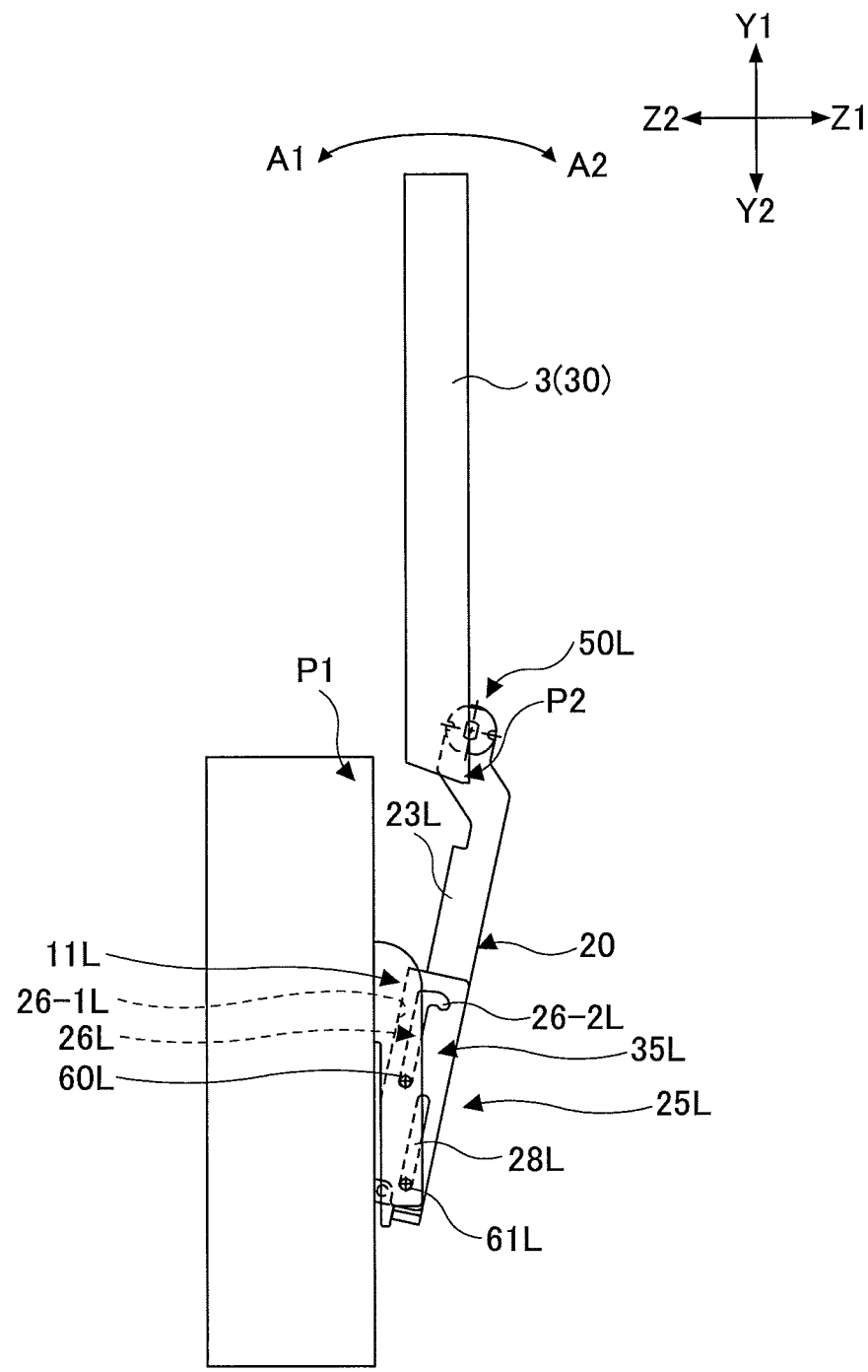
FIG. 4F is a side view (version 6) illustrating the operations of the opening and closing device and the electronic device according to the embodiment of the present invention.

FIGS. 3B and 4F indicate a state in which the display unit 3 is opened with respect to the device main body 2. In this state, both the image capturing lens and the liquid crystal display 5 that are provided in the device main body 2 are positioned at the front surface side. Namely, the position of the liquid crystal display 5 at the opened state is inverted with respect to the position of the liquid crystal display 5 in the closed state.

Consequently, a photographer can take a photograph while confirming himself/herself by the liquid crystal display 5 (i.e., a so-called "selfie" can be taken). Note that, in the following explanation, an opened state is said to be a state in which the display unit 3 is opened to a position at which a self portrait photograph can be taken.

Next, the opening and closing device 10 is explained.

As shown in FIG. 1, the opening and closing device 10 may include bases 11L and 11R; an arm plate 20; moving/locking systems 25L and 25R; a rotation plate 30; springs 40L and 40R; hinge systems 50L and 50R, and so forth.

Note that, in each of the figures that is used for the explanation, for elements that are symmetrically arranged in the left and right directions (the X1 and X2 directions in the figure), an element that is located at a right side (the side in the X1 direction) is indicated by attaching a symbol "R," and an element that is located at a left side (the side in the X2 direction) is indicated by attaching a symbol "L."

The bases 11L and 11R are formed of metal plates by press forming. The bases 11L and 11R have configurations such that fastening portions 12L and 12R and upright portions 13L and 13R are integrally formed, respectively. The fastening portions 12L and 12R are fastened to the device main body 2.

Note that, in the embodiment, a configuration is shown such that the bases 11L and 11R are separated from the device main body 2. However, the bases 11L and 11R can be integrated with the device main body 2. For a case of such a configuration, the bases 11L and 11R may be formed together with the device main body 2 by a resin.

The upright portion 13L is provided with a pin fixing hole 14L and a pin fixing hole 15L, and the upright portion 13R is provided with a pin fixing hole 14R and a pin fixing hole 15R. First slide pins 60L and 60R are fixed to the pin fixing holes 14L and 14R, respectively. Second slide pins 61L and 61R are fixed to the pin fixing holes 15L and 15R, respectively.

At this time, the first slide pins 60L and the second slide pins 61L are fixed so that they protrude toward inside from the base 11L, and the first slide pins 60R and the second slide pins 61R are fixed so that they protrude toward inside from the base 11R. Further, the first slide pin 60L and the second slide pin 61L are disposed so that they are separated in a longitudinal direction of an arm portion 23L, and the first slide pin 60R and the second slide pin 61R are disposed so that they are separated in a longitudinal direction of an arm portion 23R.

An arm plate 20 is configured such that it can be moved linearly and rotationally with respect to the bases 11L and 11R. Namely, the arm plate 20 is configured such that it can be moved linearly in the longitudinal direction of the bases 11L and 11R (the direction of the arrows Y1 and Y2 in the figure), and at the same time, the arm plate 20 is configured such that it can be moved rotationally around the second slide pins 61L and 61R (in the following explanation, the linear movement may be referred to as a slide).

The arm plate 20 is formed of a metal plate by press forming, and the arm plate 20 is integrally formed with a main portion 21, the arm portions 23L and 23R, and so forth.

The base main portion 21 has a substantially rectangular shape. The arm portions 23L and 23R are formed at respective end portions of the main portion 21 (both end portions in the directions of the arrows X1 and X2 in the figure). The arm portions 23L and 23R are bent at a right angle with respect to the base main portion 21. Thus, the arm portions 23L and 23R protrude with respect to the base main portion 21.

The arm portion 23L may include a pin fixing hole 22L; a shaft hole 24L; an L-shaped hole 26L; a long hole 28L; a fixing hole 29L, and so forth. The arm portion 23R may include a pin fixing hole 22R; a shaft hole 24R; an L-shaped hole 26R; a long hole 29R; a fixing hole 29L, and so forth.

The pin fixing holes 22L and 22R are formed at respective ends of the arm portions 23L and 23R (the end portions in the direction of the arrow Y2). A spring pin 36L is fixed to the pin fixing hole 22L, and one end portion of a spring 40L is connected to the spring pin 36L. A spring pin 36R is fixed to the pin fixing hole 22R, and one end portion of a spring 40R is connected to the spring pin 36R.

The shaft holes 24L and 24R are formed at the other end portions (the end portions in the direction of the arrow Y1 in the figure) of the arm portions 23L and 23R, respectively. The rotation plate 30 is attached to the shaft holes 24L and 24R through the hinge systems 50L and 50R, respectively.

The L-shaped hole 26L and the long hole 28L are formed so that they are arranged between the pin fixing hole 22L and the shaft hole 24L. The L-shaped hole 26R and the long hole 28R are formed so that they are arranged between the pin fixing hole 22R and the shaft hole 24R. The L-shaped hole 26L and the long hole 28L are formed to be elongated in the longitudinal direction of the arm portion 23L. The L-shaped hole 26R and the long hole 28R are formed to be elongated in the longitudinal direction of the arm portion 23R.

The L-shaped hole 26L may include a long hole portion 26-1L and a locking portion 26-2L. The L-shaped hole 26R may include a long hole portion 26-1R and a locking portion 26-2R. The long hole portion 26-1L is formed to be extended in the longitudinal direction of the arm portion 23L (the direction of the arrows Y1 and Y2 in the figure). The long hole portion 26-1R is formed to be extended in the longitudinal direction of the arm portion 23R (the direction of the arrows Y1 and Y2 in the figure). Further, the locking portion 26-2L is formed at an end portion of the long hole portion 26-1L (the end portion at the side of the direction of the arrow Y1 in the figure) such that the locking portion 26-2L extends in a direction (the direction of the arrow Z1 in the figure) that is substantially perpendicular to the longitudinal direction of the arm portion 23L. The locking portion 26-2R is formed at an end portion of the long hole portion 26-1R (the end portion at the side of the direction of the arrow Y1 in the figure) such that the locking portion 26-2R extends in a direction (the direction of the arrow Z1 in the figure) that is substantially perpendicular to the longitudinal direction of the arm portion 23R. Note that specific shapes of the locking portions 26-2L and 26-2R are described below.

The fixing holes 29L and 29R are holes for attaching slide guides 35L and 35R to the arm portions 23L and 23R, respectively. Bosses 39L and 39R (the boss 39R is not shown in the figure) are formed in the slide guides 35L and 35R, respectively. The slide guides 35L and 35R can be attached to the arm portions 23L and 23R by fitting the bosses 39L and 39R into the fixing holes 29L and 29R, respectively.

The slide guide 35L is disposed between the base 11L and the arm portion 23L. The slide guide 35R is disposed between the base 11R and the arm portion 23R. The slide guides 35L and 35R can be formed of a material having a favorable slippage, such as a fluorine-based resin.

Further, in the slide guide 35L, an L-shaped hole 37L and a long hole 38L are formed that have shapes corresponding to the L-shaped hole 26L and the long hole 28L that are formed in the arm portion 23L. In the slide guide 35R, an L-shaped hole 37R and a long hole 38R are formed that have shapes corresponding to the L-shaped hole 26R and the long hole 28R that are formed in the arm portion 23R.

The arm plate 20 that is configured as described above is attached to the bases 11L and 11R. In a state in which the arm plate 20 is attached to the bases 11L and 11R, the slide guide 35L is disposed between the base 11L and the arm portion 23L, and the slide guide 35R is disposed between the base 11R and the arm portion 23R. Thus, the arm plate 20 can be smoothly slid with respect to the bases 11L and 11R.

Further, in the state in which the arm plate 20 is attached to the bases 11L and 11R, the first slide pin 60L passes through the L-shaped hole 37L and the L-shaped hole 26L, and the first slide pin 60R passes through the L-shaped hole 37R and the L-shaped hole 26R. Thus, the first slide pins 60L and 60R protrude toward inside the arm portions 23L and 23R, respectively.

Furthermore, in the state in which the arm plate 20 is attached to the bases 11L and 11R, the second slide pin 61L passes through the long hole 38L and the long hole 28L, and the second slide pin 61R passes through the long hole 38R and the long hole 28R.

The first slide pin 60L can be relatively moved within the L-shape hole 26L and the L-shape hole 37L, and the first slide pin 60R can be relatively moved within the L-shape hole 26R and the L-shape hole 37R. Similarly, the second slide pin 61L can be relatively moved within the long hole 38L and the long hole 28L, and the second slide pin 61R can be relatively moved within the long hole 38R and the long hole 28R.

As described above, the one end portion of the spring 40L is connected to the spring pin 36L that is fixed to the arm portion 23L, and the one end portion of the spring 40R is connected to the spring pin 36R that is fixed to the arm portion 23R. Further, the other end portion of the spring 40L is connected to the first slide pin 60L that protrudes toward inside the arm portion 23L, and the other end portion of the spring 40R is connected to the first slide pin 60R that protrudes toward inside the arm portion 23R.

Namely, the springs 40L and 40R are disposed between the bases 11L and 11R and the arm plate 20. The springs 40L and 40R are for elastically biasing the arm plate 20 with respect to the bases 11L and 11R, so that the arm plate 20 can be moved toward a proceeding position.

In the embodiment, coil springs are used as the springs 40L and 40R, and their disposed positions are close to the arm portions 23L and 23R, respectively. As described below, the rotation plate 30 is disposed between the pair of the arm portions 23L and 23R. However, the coil springs do not interfere with the rotation plate 30 because the coil springs are small.

Note that, in the embodiment, the coil springs are used for elastically biasing the arm plate 20. However, another elastic member (e.g., a torsion spring) may be used.

Next, the rotation plate 30 is explained.

The rotation plate 30 is formed of a metal plate by press forming. The rotation plate 30 may include a main portion 31; bent portions 32; attachment arms 33L and 33R, and so forth. The display unit 3 of the electronic device 1 is attached to the rotation plate 30. Thus, the display unit 3 can move together with the rotation plate 30.

The slide main portion 31 has a substantially rectangular shape, and its outer peripheral four edges are bent at almost the right angle, and thereby the bent portions 32 are formed. The liquid crystal display 5 that is provided in the display unit 3 is attached to inside the bent portions 32.

The attachment arms 33L and 33R are integrally formed in the main portion 31 at both end portions of the rotation plate 30 in the direction of the arrow Y1 in the figure. The attachment arm 33L is rotatably connected to, by using the hinge system 50L, the shaft hole 24L that is provided in the arm 23L, and the attachment arm 33R is rotatably connected to, by using the hinge system 50R, the shaft hole 24R that is provided in the arm 23R.

The hinge systems 50L and 50R are for connecting the rotation plate 30 to the arm plate 20, so that the rotation plate 30 can be rotated in the directions of the arrows A1 and A2 in the figure. The hinge system 50L may include a hinge pin 51L; a spacer 52L; a click plate 53L, and so forth. The hinge system 50R may include a hinge pin 51R; a spacer 52R; a click plate 53R, and so forth.

Next, the moving/locking systems 25L and 25R are explained.

The moving/locking systems 25L and 25R can function as a moving system for sliding (linearly moving) and rotationally moving the arm plate 20 with respect to the bases 11L and 11R. Additionally, the moving/locking systems 25L and 25R can function as a locking system for locking the arm plate 20 at a closed position.

The moving/locking system 25L may include the L-shaped hole 26L; the long hole 28L; the first slide pin 60L; the second slide pin 61L; the spring 40L, and so forth. The moving/locking system 25R may include the L-shaped hole 26R; the long hole 28R; the first slide pin 60R; the second slide pin 61R; the spring 40R, and so forth.

As described above, the first slide pin 60L is configured such that it can be moved relatively and within the L-shaped hole 26L and the L-shaped hole 37L, and the first slide pin 60R is configured such that it can be moved relatively and within the L-shaped hole 26R and the L-shaped hole 37R. Further, the second slide pin 61L is configured such that it can be moved relatively and within the long hole 28L and the long hole 38L, and the second slide pin 61R is configured such that it can be moved relatively and within the long hole 28R and the long hole 38R.

Thus, in a state in which the arm plate 20 is attached to the bases 11L and 11R, the arm plate 20 can be slid with respect to the bases 11L and 11R in the longitudinal direction of the arm portions 23L and 23R by moving the first slide pins 60L and 60R with respect to the long hole portions 26-1L and 26-1R of the L-shaped holes 26L and 26R while the first slide pins 60L and 60R are guided by the long hole portions 26-1L and 26-1R of the L-shaped holes 26L and 26R, respectively, and by moving the second slide pins 61L and 61R with respect to the long holes 28L and 28R (the long holes 38L and 38R) while the second slide pins 61L and 61R are guided by the long holes 28L and 28R (the long holes 38L and 38R), respectively.

Figure 5:
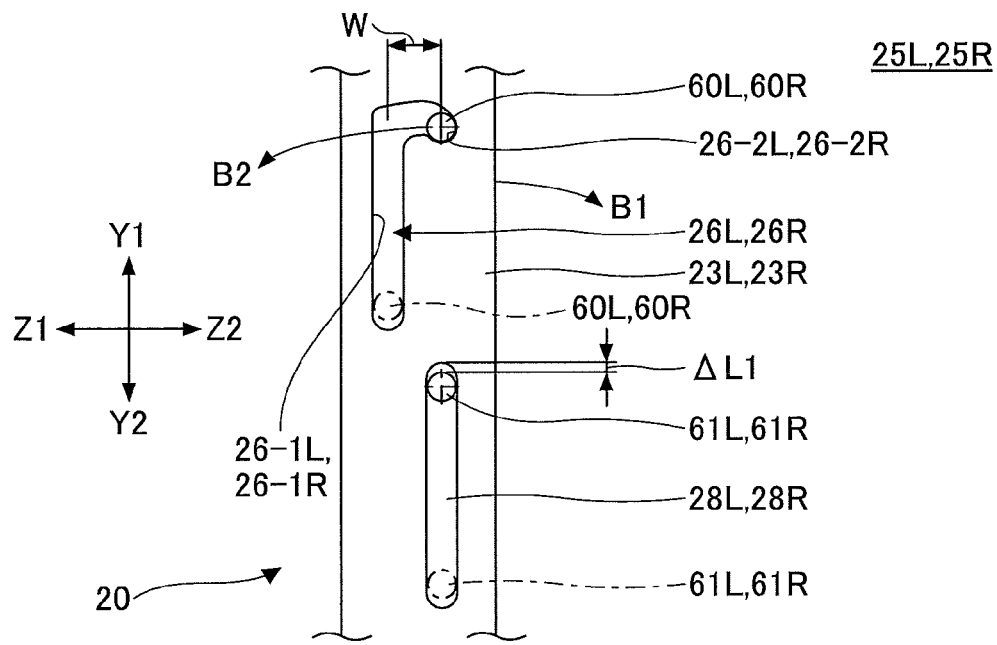
FIG. 5 is a diagram enlarging and showing a moving/locking system.

FIG. 5 is a diagram enlarging and showing the moving/locking systems 25L and 25R. As shown in FIG. 5, the first slide pins 60L and 60R are inserted into the L-shaped holes 26L and 26R, respectively, and the second slide pins 61L and 61R are inserted into the long holes 28L and 28R, respectively.

While the display unit 3 of the electronic device 1 is in the closed state, the first slide pins 60L and 60R are positioned within the locking portions 26-2L and 26-2R of the L-shaped holes 26L and 26R, respectively, and the slide pins 60L and 60R are locked by the locking portions 26-2L and 26-2R, respectively. Thus, even if the arm plate 20 is biased by the springs 40L and 40R, and thereby the arm plate 20 is to be slid with respect to the bases 11L and 11R, the slide can be restricted by the locking of the first slide pins 60L and 60R by the locking portions 26-2L and 26-2R.

Note that, in the following explanation, the state in which the first slide pins 60L and 60R of the moving/locking systems 25L and 25R are locked by the locking portions 26-2L and 26-2R, respectively, is referred to as a locked state. Additionally, the position of the arm plate 20 in the locked state is referred to as a retracted position.

The locking portions 26-2L and 26-2R are formed in a direction that is substantially perpendicular to the longitudinal direction of the arm portions 23L and 23R. Thus, the first slide pins 60L and 60R can be relatively moved within ranges (the ranges that are indicated by the arrow W in FIG. 5) in which the locking portions 26-2L and 26-2R are formed.

As the first slide pins 60L and 60R move within the locking portions 26-2L and 26-2R, respectively, the arm plate 20 is rotated with respect to the bases 11L and 11R while using the second slide pins 61L and 61R as an axis of rotation. The locking portions 26-2L and 26-2R have arc shapes that correspond to the trajectories of the first slide pins 60L and 60R.

As the first slide pins 60L and 60R relatively move within the locking portions 26-2L and 26-2R in the direction that is indicated by the arrow B2 in FIG. 5, respectively, and the first slide pins 60L and 60R reach the long hole portions 26-1L and 26-1R, respectively, the locking of the first slide pins 60L and 60R by the locking portions 26-2L and 26-2R is released. Consequently, the first slide pins 60L and 60R are in a state in which the first slide pins 60L and 60R can be slid within the long hole portions 26-1L and 26-1R, respectively.

Consequently, the arm plate 20 is in a state in which the arm plate 20 can be slid (can be linearly moved) with respect to the bases 11L and 11R, and the arm plate 20 slides while being biased by the springs 40L and 40R. At this time, the rotation plate 30 also slides in the direction of the arrow Y1 in the figure together with the arm plate 20 because the rotation plate 30 is attached to the arm plate 20 through the hinge systems 50L and 50R.

The slide of the arm plate 20 is stopped as the first slide pins 60L and 60R contact the end portions of the L-shaped holes 26L and 26R in the direction of the arrow Y2 in the figure, respectively, and the second slide pins 61L and 61R contact the end portions of the long holes 28L and 28R in the direction of the arrow Y2 in the figure, respectively. Hereinafter, the position of the arm plate 20 in the stopped state is referred to as a forward position.

While the arm plate 20 is slid, the second slide pins 61L and 61R, which can be a center of the rotation of the arm plate 20 with respect to the bases 11L and 11R, move along the long holes 28L and 28R, respectively. In this manner, in the embodiment, the second slide pins 61L and 61R, which can be the center of the rotation of the arm plate 20, can be moved and rotated with respect to the long holes 28L and 28R, and can be slid (linearly moved) with respect to the long holes 28L and 28R, respectively.

The rotation plate 30 is configured such that it can be rotated regardless of the position of the arm plate 20. During the closed state of the electronic device 1 and the opening and closing device 10, as the rotation plate 30 is rotated in the direction that is indicated by the arrow A2 in the figure, the rotation plate 30 is superposed on the arm plate 20 (cf.

FIG. 2A). Hereinafter, the position where the rotation plate 30 is superposed on the arm plate 20 is referred to as a closed position.

In contrast, as the rotation plate 30 is rotated in the direction that is indicated by the arrow A1 in the figure, a state of the electronic device 1 and the opening and closing device 10 becomes the opened state. In the opened state, the rotation plate 30 is inverted with respect to the closed position, and the rotation plate 30 is substantially parallel with the bases 11L and 11R. Hereinafter, the position of the rotation plate 30 at which the rotation plate 30 is parallel with the bases 11L and 11R is referred to as an opened position.

Next, the operation of the electronic device 1 and the opening and closing device 10 having the above-described configuration is explained by referring to FIGS. 4A-4G.

Note that, in FIGS. 4A-4G, the operation of the electronic device 1 and the opening and closing device 10 on the left side is shown. The explanation and depiction of the right side are omitted because the operation of the electronic device 1 and the opening and closing device 10 on the right side is the same as that of the left side.

Note that, in FIGS. 4A-4G, for convenience of the explanation, the shapes of the electronic device 1 and the opening and closing device 10 are depicted to be partially different from the shapes that are shown in FIGS. 1-3. However, the shapes are substantially the same.

FIGS. 2A, 2B, and 4A show the electronic device 1 and the opening and closing device 10 in the closed state. In the closed state, the arm plate 20 is positioned at the retracted position by sliding in the direction of the arrow Y2 in the figure, and the rotation plate 30 is positioned at the closed position by rotating in the direction of the arrow A2.

Further, in the closed state, the first slide pins 60L and 60R of the moving/locking systems 25L and 25R are locked at the locking portions 26-2L and 26-2R, respectively. Thus, regardless of the biasing force of the springs 40L and 40R, the retracted position of the arm plate 20 is maintained.

In order to cause the above-described closed state of the electronic device 1 and the opening and closing device 10 to be transitioned to the opened state, the display unit 3 can be rotated in the direction of the arrow A1 in the figure. FIG. 4B shows a state in which the display unit 3 is rotated in the direction of the arrow A1 in the figure by a slight amount.

By rotating the display unit 3, the rotation plate 30 to which the display unit 3 is attached is rotated, with respect to the arm plate 20, around the hinge systems 50L and 50R.

Now, as shown in the figures by the arrows, the end portion of the device main body 2 and the end portion of the display unit 3 at the side at which the hinge systems 50L and 50R are provided are denoted by P1 and P2, respectively. By rotating the display unit 3, the corner portion P1 of the device main body 2 contacts the corner portion P2 of the display unit 3. The contact position is denoted by the arrow D in FIGS. 4B-4E.

By further rotating the display unit 3 in the direction of the arrow A1, the leverage effect is generated at the display 3 with the contact position D as a supporting point. Consequently, force is applied to the arm plate 20 that is for rotating the arm plate 20 around the second slide pins 61L and 61R. Specifically, the force is applied to the arm plate 20 that is for rotating the arm plate 20 in the direction that is indicated by the arrow B1 in FIG. 4B.

As the arm plate 20 rotates in the direction of the arrow B1 in the figure, the first slide pins 60L and 60R relatively move in the direction of the arrow B2 in the figure within the locking portions 26-2L and 26-2R, respectively, as shown in FIGS. 4C and 4D.

As described above, the shapes of the locking portion 26-2L and 26-2R correspond to the rotation trajectories of the first slide pins 60L and 60R (i.e., the arc shapes). Thus, when the first slide pins 60L and 60R are to be moved within the locking portions 26-2L and 26-2R, the first slide pins 60L and 60R tend to be displaced in the direction of the arrow Y1 in the figure.

In the embodiment, as shown in FIG. 5, the clearance that is indicated by the arrow ΔL1 in FIG. 5 is provided between the second slide pin 61L and the long hole 28L, and between the second slide pin 61R and the long hole 28R. The length of the clearance ΔL1 corresponds to an amount of the above-described relative displacement of the first slide pins 60L and 60R in the direction of the arrow Y1. Thus, as the device main body 2 is moved in the direction of the arrow A1 in the figure, the first slide pins 60L and 60R can be smoothly moved within the locking portions 26-2L and 26-2R, respectively.

FIG. 4E shows a state that is immediately prior to separation of the first pins 60L and 60R from the locking pins 26-2L and 26-2R, respectively. As the display unit 3 is further moved in the direction of the arrow A1 in the figure from this state, the first slide pins 60L and 60R are separated from the locking portions 26-2L and 26-2R, respectively, and the first slide pins 60L and 60R proceed to the long hole portions 26-1L and 26-1R of the L-shaped holes 26L and 26R, respectively.

Consequently, the locking of the arm plate 20 by the moving/locking systems 25L and 25R is released, and the arm plate 20 is in a slidable state. Thus, the arm plate 20 can be slid (linearly moved) toward the forward position, as the arm plate 20 is biased by the springs 40L and 40R, as the first slide pin 60L and 60R relatively move within the long hole portions 26-1L and 26-1R of the L-shaped holes 26L and 26R, respectively, and as the second slide pins 61L and 61R relatively move within the long holes 28L and 28R, respectively.

Further, in a state in which the arm plate 20 is moved to the forward position, by rotating the rotation plate 30 to the opened state, the liquid crystal display 5 that is provided in the display unit 3 can be rotated to the opened position where the liquid crystal display 5 is directed to the front side (in the figure, the side of the direction of Z2 is the front side).

FIG. 4F shows a state in which the rotation plate 30 is moved to the opened position. In this state, the device main body 2 and the display unit 3 are vertically arranged in parallel. In this manner, by rotating the rotation plate 30 to the opened position, the state of the electronic device 1 and the opening and closing device 10 becomes the opened state, thereby allowing so called "selfie" to be taken.

The operation for rotating the display unit 3 from the opened position toward the closed position is substantially reverse to the above-described operation for moving the display unit 3 from the closed position toward the opened position.

Figure 4G:
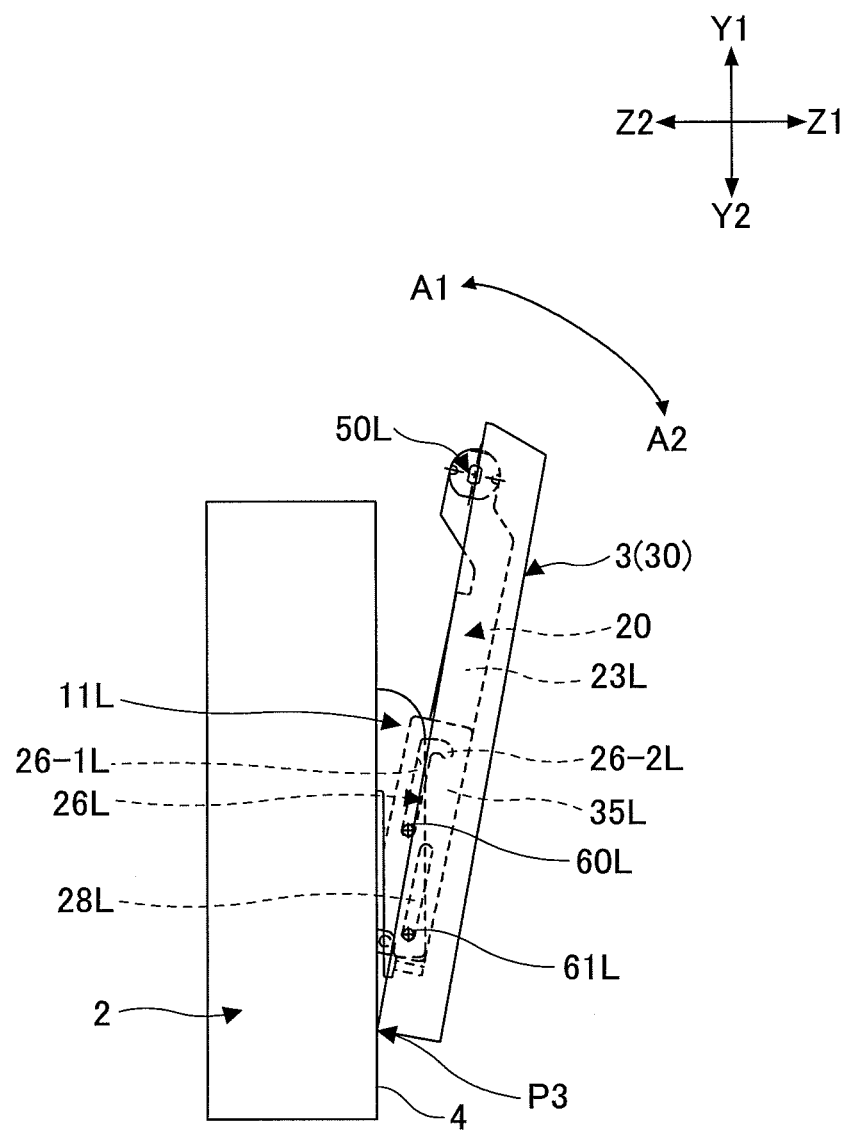
FIG. 4G is a side view (version 7) illustrating the operations of the opening and closing device and the electronic device according to the embodiment of the present invention.

In order to cause the state of the electronic device 1 and the opening and closing device 10 to be transitioned to the closed state, the display unit 3 (the rotation plate 3) can be moved in the direction of the arrow A2 in the figure. By doing this, the end portion (which is indicated by the arrow P3 in the figure) of the device main body 2 contacts the display unit accommodating portion 4 of the device main body 2, as shown in FIG. 4G. At this time, the forward position of the arm plate 20 is maintained.

In this state, the display unit 3 is tilted with respect to the device main body 2 (the state of the display unit 3 is referred to as a tilted state, hereinafter). Even if the state is the tilted state, the electronic device 1 according to the embodiment can take a photograph. For example, during so-called "high-angle photographing" such that the electronic device 1 is disposed above an eye line of a photographer, and photographing is performed in a downward direction, photographing angles can be diversified. That is because the photographer can directly view the liquid crystal display 5 from below, for example.

In order to cause the state of the electronic device 1 and the opening and closing device 10 to be transitioned to the closed state, the display unit 3 can be further moved from the tilted state toward the closed state.

By moving the display unit 3 toward the closed position, the first slide pins 60L and 60R and the second slide pins 61L and 61R are moved from the positions that are shown in FIG. 5 by the dashed line to the positions that are shown by the solid line (moved toward the direction of the arrow Y1 in the figure). Then, after the slide pins 60L and 60R are moved to the positions facing the locking portions 26-2L and 26-2R, respectively, the display unit 3 can be pressed toward the device main body 2.

By doing this, the first slide pins 60L and 60R are locked to the locking portions 26-2L and 26-2R, respectively, and the arm plate 20 is again in the state in which the arm plate 20 is locked at the retracted position by the moving/locking systems 25L and 25R.

As described above, in the electronic device 1 and the opening and closing device 10 according to the embodiment, the arm plate 20 can be slid with respect to the bases 11L and 11R. Thus, slimming and downsizing can be achieved.

Additionally, locking and unlocking of the display unit 3 (the arm plate 20) with respect to the device main body 2 (the bases 11L and 11R) can be performed by one action, namely, by only rotating the display unit 3. Thus, operability can be enhanced.

Figure 6:
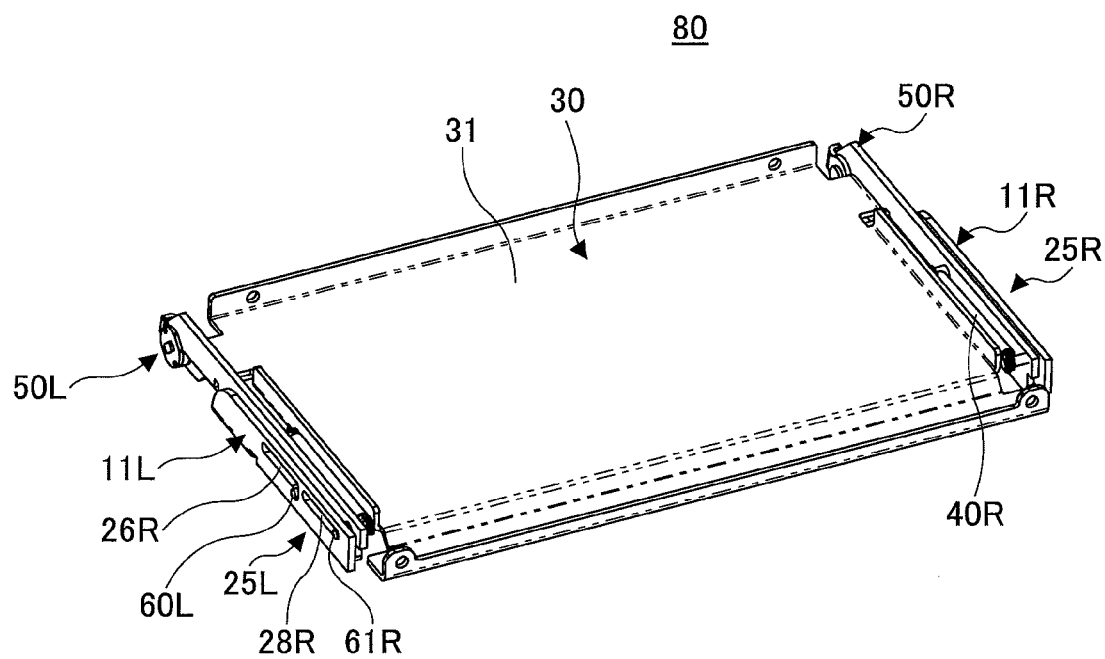
FIG. 6 is a perspective view of the opening and closing device according to a modified example.

FIG. 6 shows an opening and closing device 80 according to a modified example of the embodiment.

In the above-described embodiment, the first slide pins 60L and 60R and the second slide pins 61L and 61R are provided in the bases 11L and 11R, respectively, and the L-shaped holes 26L and 26R and the long holes 28L and 28R are provided in the arm plate 20.

However, as shown in FIG. 6, the first slide pins 60L and 60R and the second slide pins 61L and 61R can be provided in the arm plate 20, and the L-shaped holes 26L and 26R and the long holes 28L and 28R can be provided in the bases 11L and 11R, respectively.

The preferred embodiment of the present invention is described in detail above. However, the present invention is not limited to the above-described specific embodiment, and various modifications and alterations can be made within the gist of the present invention that is described in the scope of the claims.

What is claimed is:

1. An opening and closing device comprising:
   a base;
   a movable member that is moved between a retracted position and a forward position by making linear movement and rotational movement with respect to the base; and
   a locking system for locking the movable member at the retracted position,
   wherein, in response to the movable member being rotationally moved with respect to the base by a predetermined distance, the locking system is configured to release locking of the movable member and to allow the linear movement of the movable member with respect to the base.

2. The opening and closing device according to claim 1, wherein the locking system includes
   a locking member that is provided in one of the base and the movable member, and
   a locking portion that is provided in the other one of the base and the movable member, wherein the locking portion is configured to lock the locking member upon the movable member being moved to the retracted position.

3. The opening and closing device according to claim 1, wherein the movable member is provided with a rotation member that is rotated between a closed position and an opened position.

4. The opening and closing device according to claim 3, wherein, at the closed position, the rotation member is in a state in which the rotation member is superposed on the movable member, and
   wherein, at the opened position, the rotation member is in a state in which the rotation member is inverted with respect to the closed position, and the rotation member is parallel with the base.

5. The opening and closing device according to claim 1, further comprising:
   an elastic member configured to bias the movable member toward the forward position.

6. An electronic device comprising:
   a first housing;
   a second housing; and
   an opening and closing device,
   wherein the opening and closing device includes
   a base,
   a movable member that is moved between a retracted position and a forward position by making linear movement and rotational movement with respect to the base, and
   a locking system for locking the movable member at the retracted position,
   wherein, in response to the movable member being rotationally moved with respect to the base by a predetermined distance, the locking system is configured to release locking of the movable member and to allow the linear movement of the movable member with respect to the base,
   wherein the movable member is provided with a rotation member that is rotated between a closed position and an open position,
   wherein the first housing is attached to the base, the second housing is attached to the rotation member, and a display device is attached to the second housing, and
   wherein a direction of the display device in a state in which the rotation member is at the closed position is inverted from a direction of the display device in a state in which the rotation member is at the opened position.

7. The electronic device according to claim 6, wherein, in a state in which the movable member is at the forward position, by causing the rotation member to be in the state in which the rotation member is at the closed position, the second housing is caused to be in a state in which the second housing is tilted with respect to the first housing.

* * * * *